(12) United States Patent
Patel

(10) Patent No.: US 10,394,460 B1
(45) Date of Patent: Aug. 27, 2019

(54) ENHANCED DATA BUFFER AND INTELLIGENT NV CONTROLLER FOR SIMULTANEOUS DRAM AND FLASH MEMORY ACCESS

(71) Applicant: Integrated Device Technology, Inc., San Jose, CA (US)

(72) Inventor: Shwetal Patel, San Jose, CA (US)

(73) Assignee: INTEGRATED DEVICE TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/675,591

(22) Filed: Mar. 31, 2015

(51) Int. Cl.
*G06F 12/00* (2006.01)
*G06F 3/06* (2006.01)

(52) U.S. Cl.
CPC ............ *G06F 3/0611* (2013.01); *G06F 3/068* (2013.01); *G06F 3/0656* (2013.01); *G06F 3/0659* (2013.01); *G06F 2003/0691* (2013.01)

(58) Field of Classification Search
CPC ...... G06F 3/0611; G06F 3/0656; G06F 3/068; G06F 3/0659; G06F 203/0691
See application file for complete search history.

(56) References Cited

U.S. PATENT DOCUMENTS

| 9,348,539 B1* | 5/2016 | Saxena | G06F 3/0685 |
| 2010/0042773 A1* | 2/2010 | Yeh | G06F 12/0804 |
| | | | 711/103 |
| 2014/0237157 A1* | 8/2014 | Takefman | G06F 11/1008 |
| | | | 711/3 |
| 2015/0127890 A1* | 5/2015 | Brainard | G06F 13/1694 |
| | | | 711/103 |
| 2015/0169238 A1* | 6/2015 | Lee | G06F 12/0871 |
| | | | 711/103 |

* cited by examiner

*Primary Examiner* — David Yi
*Assistant Examiner* — Alan Otto
(74) *Attorney, Agent, or Firm* — Heimlich Law, PC; Alan Heimlich, Esq.

(57) ABSTRACT

Operation of an Enhanced Data Buffer and Intelligent NV Controller for Simultaneous DRAM and Flash Memory Access has been disclosed. In one implementation a host can operate at full DRAM speed to a DIMM having thereon a NV Controller, DRAM, and flash memory.

1 Claim, 7 Drawing Sheets ly at 100, one embodiment of the

ENHANCED DATA BUFFER AND INTELLIGENT NV CONTROLLER FOR SIMULTANEOUS DRAM AND FLASH MEMORY ACCESS

FIELD OF THE INVENTION

The present invention pertains to memory access. More particularly, the present invention relates to an Enhanced Data Buffer and Intelligent NV (non-volatile) Controller for Simultaneous DRAM (dynamic random access memory) and Flash Memory Access.

BACKGROUND OF THE INVENTION

Many computer systems today use the dual in-line memory module (DIMM) format for main memory.

Many computer systems today use flash memory. This flash memory may be used, for example, to backup main memory in the event of a power failure. Flash memory may also be used in a solid state disk (SSD).

DRAM is a fast memory and flash memory is a block device having slow access.

This presents a technical problem when trying to interface DRAM with flash memory for which a technical solution using a technical means is needed.

BRIEF DESCRIPTION OF THE DRAWINGS

The invention is illustrated by way of example and not limitation in the figures of the accompanying drawings.

DETAILED DESCRIPTION

Figure 1:
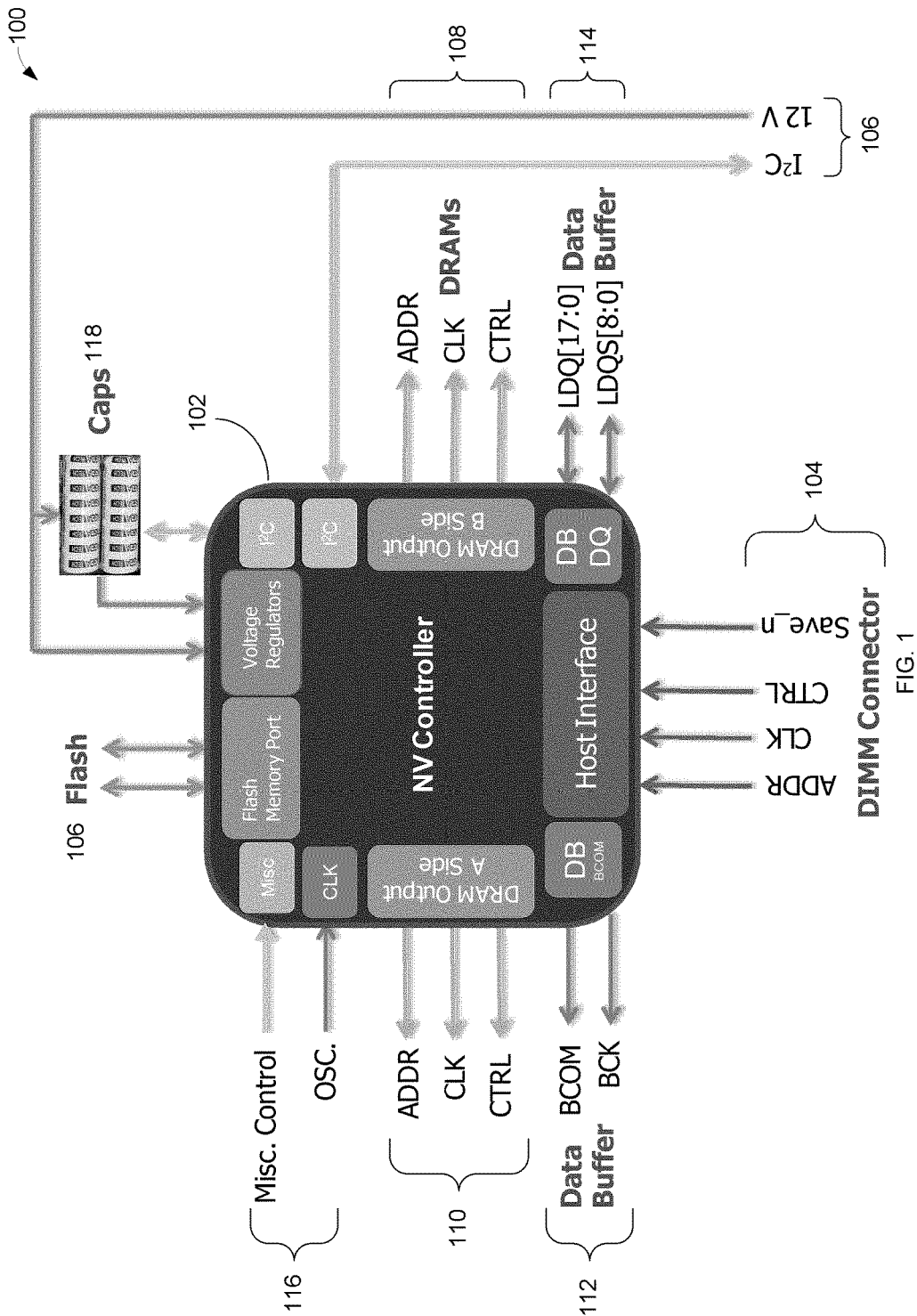
FIG. 1 shows one embodiment of the invention showing a NV Controller block diagram.

In one embodiment the invention allows concurrent access to DRAM as system DRAM memory at full bandwidth while allowing access to flash memory as a block device storage. This is done using an enhanced data buffer device and a NV controller situated on a DIMM module having the DRAM and flash memory.

In one embodiment the invention allows access to DRAM and flash concurrently.

In one embodiment the invention allows access to flash while not significantly impacting DRAM access at the same time.

In one embodiment the invention allows backup of DRAM data to flash in case of power fail and also allows any access to flash memory.

In one embodiment the invention provides a solution that allows DRAM access at full speed to achieve high performance and flash access for storage.

In one embodiment of the invention, a data buffer is enhanced by adding FIFO (first in first out) memory in both directions (input and output).

In one embodiment the invention adds intelligent NV controller operation that communicates to the enhanced data buffer and processes OS (operating system)/Host requests to a flash memory interface in the background while processing DRAM access commands.

In one embodiment the invention addresses the need to access storage memory close to the processor without compromising DRAM performance.

In one embodiment the invention allows transparent access to DRAM and flash at the same time, the transparency from the standpoint that a host processor sees the same interface and level of performance from the DRAM and the flash memory.

In one embodiment of the invention DRAM performance and flash access are provided by a single chip integrated circuit (IC).

In one embodiment of the invention DRAM performance and flash access are provided by an IC with no compromise in DRAM performance.

In one embodiment of the invention increased flash capacity on a DIMM is possible for a true storage device versus just a DRAM store.

In one embodiment of the invention DRAM and flash memory for storage of more than just DRAM contents is on a single DIMM.

In one embodiment the invention allows the OS/CPU (Operating System/Central Processor Unit) to have simultaneous access to: DRAM ranks as system memory and flash memory as a block device.

In one embodiment the invention allows DRAM access at full bandwidth, for example, DDR4 DRAM (double data rate fourth generation synchronous dynamic random access memory) speed up to 3200 MT/s (mega transfers per second).

In one embodiment the invention allows flash memory access, for example, the ability to access flash memory as storage (SSD) with true block access (e.g. 64 byte granularity).

In one embodiment of the invention the NV Controller is mounted on a DIMM with DRAM and flash memory and makes connection with the DIMM connector and connects to all the DIMM interface signals and connects to and controls all the DRAM and flash memory interfaces. That is, the NV Controller is a single chip IC solution for interfacing between the DIMM connector signals and the DRAM and flash memory.

FIG. 1 illustrates, generally at 100, one embodiment of the invention showing a System block diagram. The NV Controller 102 appears fully transparent to a host controller. The NV Controller 102 has enhanced feature sets, and can handle customer specific requirements, for example, by microcoding of the NV controller 102. At 104 is the interface to the DIMM Connector shown with the signals ADDR, CLK, CTRL, Save_n (respectively: address, clock, control, and save negative logic). At 106 is a 12V (volt) power supply input and an I²C (Inter-Integrated Circuit) interface. At 108 is a DRAM interface (Side B) having ADDR, CLK, and CTRL. At 110 is a DRAM interface (Side A) having ADDR, CLK, and CTRL. At 112 is the data buffer control BCOM and BCK. At 114 is a data buffer interface LDQ[17:0], and LDQS[8:0]. At 116 are miscellaneous controls and the oscillator input (Misc. Control, OSC.) At 106 is a flash interface (Flash Memory Port) and at 118 capacitors (Caps) for holding up power (e.g. long enough for the NV Controller to perform operations on a power fail) (going to Voltage Regulators). Caps 118 may be super caps.

Figure 2:
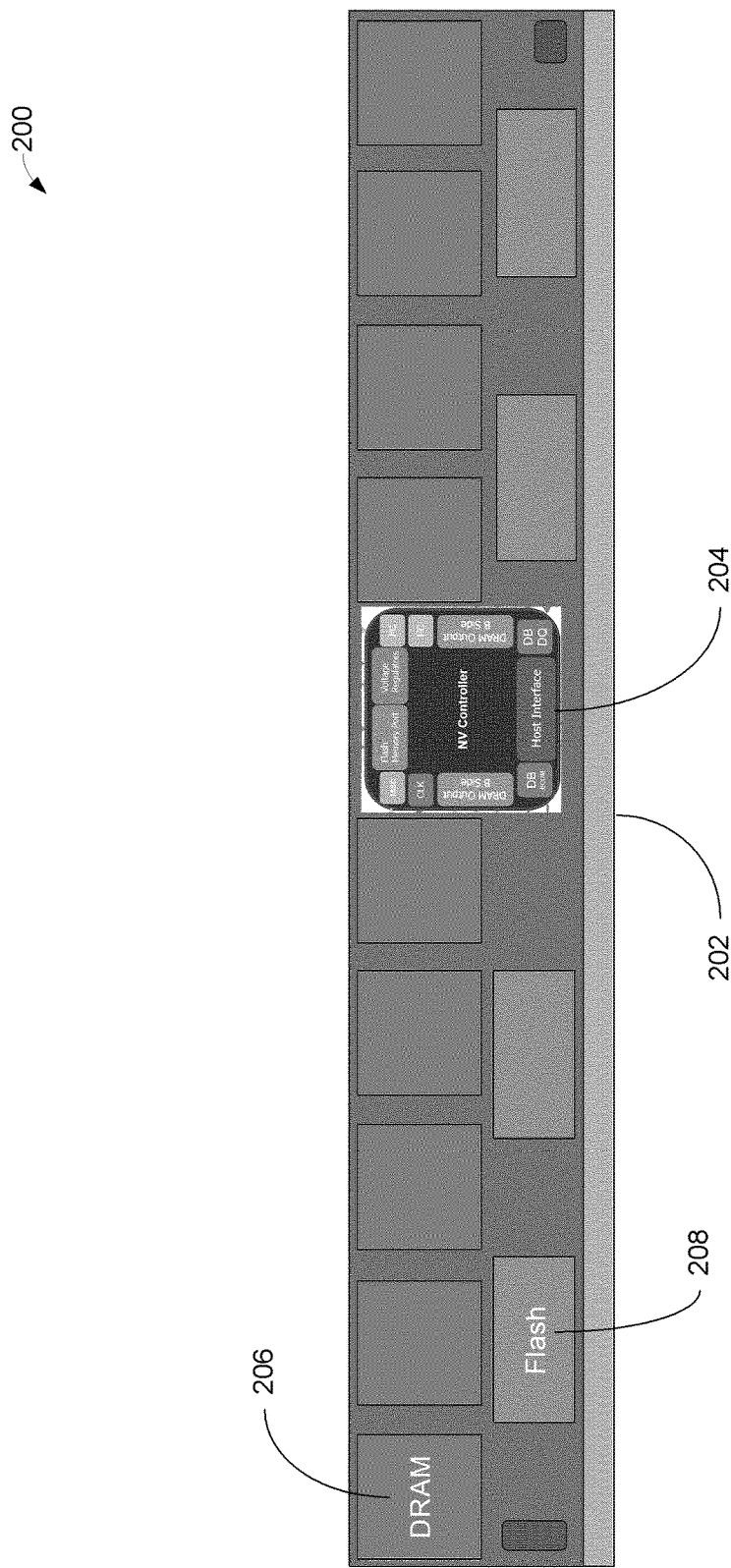
FIG. 2 shows one embodiment of the invention showing a NV Controller in a DIMM with DRAM and flash memory.

FIG. 2 illustrates, generally at 200, one embodiment of the invention showing one side of a DIMM 202 having on it the NV Controller 204, representative DRAM 206 (square in shape), and flash 208 (rectangular in shape).

In one DIMM embodiment (for example as shown in FIG. 2) there is no compromise in DRAM performance and there is flash capacity for a true storage device (SSD). Additionally, since the DRAM and flash memory are on a single DIMM, there is considerable space savings especially for a single board controller or computer. Further the performance of the CPU or computer is enhanced because there are no other busses needed, for example for a SSD interface (e.g. SATA (Serial Advanced Technology Attachment), SCSI (Small Computer System Interface), etc. Further the performance of the CPU is improved because there are no other busses loading down the CPU.

The Intelligent NV Controller, such as illustrated in FIG. 1 controls the Data Buffer data 114 flow through the BCOM port 112 based on host commands from a CPU received through the DIMM Connector 104 interface. A command for the DRAM (Read or Write) data flows from host interface (104) to the DRAM interface (108, 110) and vice versa. A command for the flash (Read or Write) data flows from host interface (104) to the LDQ interface (shown at 114) and vice versa through a WR (write) and RD (read) FIFO in the data buffer. In the flash interface data is moved from the WR FIFO to, for example, a SATA/eMMC/UFS/NAND (embedded multi media card, Universal Flash Storage) port, and from the SATA/eMMC/UFS/NAND port to the RD FIFO. Thus the NV Controller 102 concurrently processes host DRAM commands and flash commands. Additionally, new commands can be defined for the NV controller (102)/flash through the MR7 (mode register 7) RCW (register command words) command space.

In one embodiment of the invention the Intelligent NV Controller, such as illustrated in FIG. 1 uses sufficient latency to give the NV Controller time to communicate to the Data Buffer. That is, there is time to move data from the WR FIFO to the UFS (universal flash storage)/eMMC/SATA/NAND port and from the UFS/eMMC/SATA/NAND port to the RD FIFO. Thus the Intelligent NV Controller concurrently processes host DRAM commands and flash memory related commands.

A host controller (for example interfaced to the DIMM Connector 104 in FIG. 1) manages data traffic on the host DDR bus as DRAM data or data buffer WR/RD FIFO data. It can manage simultaneous operation on the Data Buffer DRAM/host interface and the LDQ interface. For example, the host writes WR data to the FIFO (32 bytes) followed by WR data to DRAM (64 bytes). Another example, the host reads DRAM data while Data is accessed from the NV Controller to the RD FIFO. The host ensures no overflow on the WR/RD FIFO for the LDQ port.

The Intelligent NV Controller, such as illustrated in FIG. 1 has several capabilities and advantages. One is concurrent access to DRAM memory at full speed and flash memory as a storage. For example, there is no compromise on DRAM memory channel bandwidth (BW) and hence little to no performance loss. There is negligible BW loss at DRAM peak bandwidth. For example at 2133 MT/, (17 GB/s total DRAM bandwidth) less than 3% BW loss (from Peak bandwidth) from the DRAM bandwidth and while providing 450 MB/s bandwidth for flash. Additionally, considering sustained DRAM BW, the DRAM bandwidth loss may be near zero.

Another is possibly removing a HD (hard disk) completely from the system. This would allow more space for other components or better form factor solutions.

Another is access to DIMMs with flash only memory for storage. This would allow new non-volatile DIMMs designed with the NV Controller. Further this would allow utilization of available empty DIMM sockets.

Another is persistent data in case of a power fail. This could be a superset feature. For example, the NV Controller could sense a power fail and save the DRAM data to the flash memory.

Another is data can be periodically moved to flash. This could be a superset feature. For example, the host CPU might save the data every X seconds.

The NV Controller can have several modes of operation, for example, one mode is a data persistent mode handling a power fail event. Another mode, for example, is a host in band commands a data persistent mode without a power fail event. Another mode is concurrent DRAM and flash access.

Figure 3:
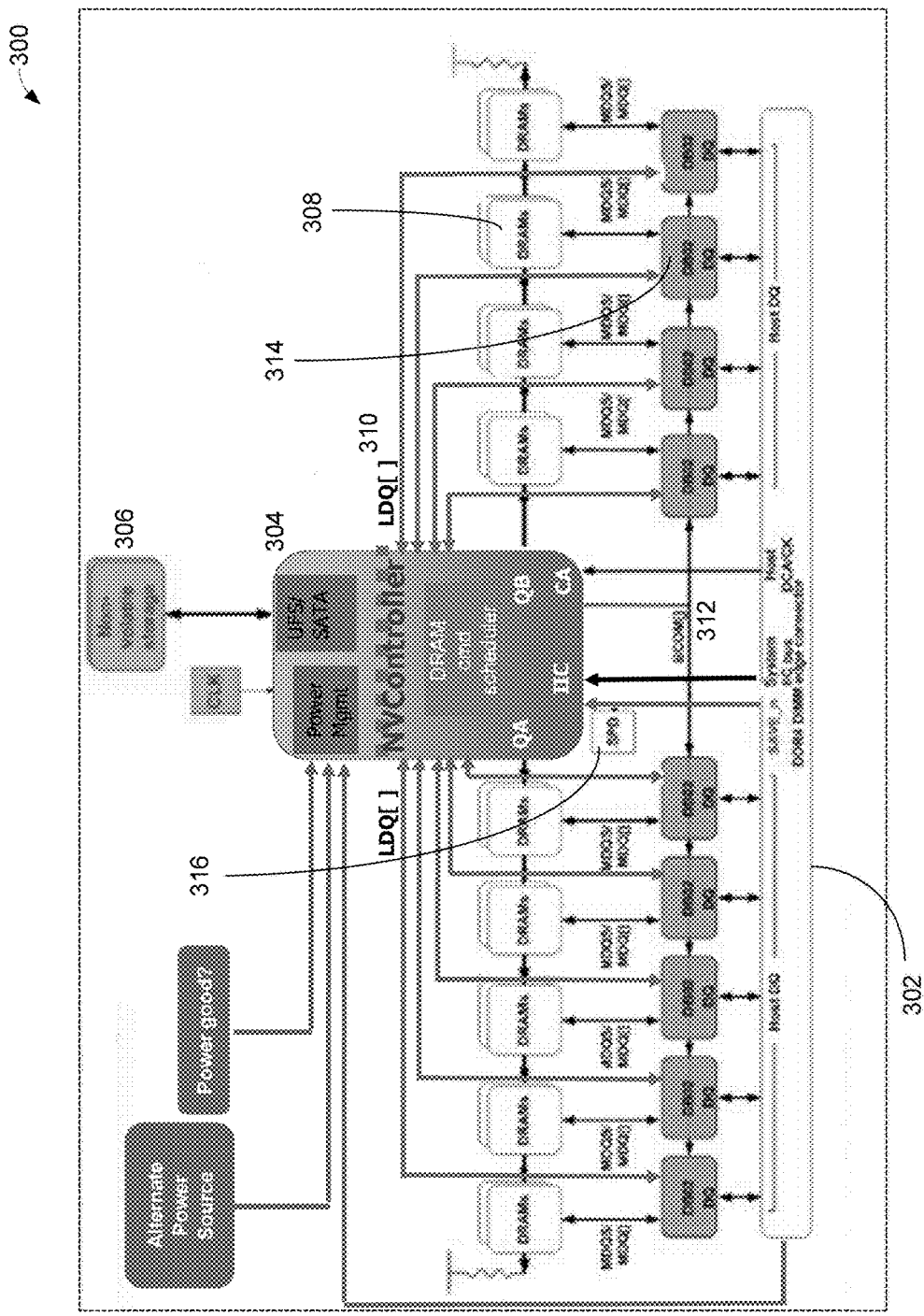
FIG. 3 shows one embodiment of the invention showing an integrated non-volatile DIMM controller architecture.

FIG. 3 illustrates, generally at 300, one embodiment of the invention showing an integrated non-volatile DIMM controller architecture. At 302 is a DIMM interface, at 304 is an integrated NV (non-volatile) Controller, at 306 flash memory, at 308 a representative DRAM, at 310 a representative LDQ bus, at 312 the BCOM bus, at 314 a representative enhanced data buffer, and at 316 a SPD (serial presence detect).

In one embodiment of the invention, for example as shown in FIG. 3 the LDQ busses are each 2 bits wide (e.g. LDQ[1:0]).

In one embodiment of the invention, for example as shown in FIG. 3 the DIMM interface offers a load reduced DIMM functionality.

Figure 4:
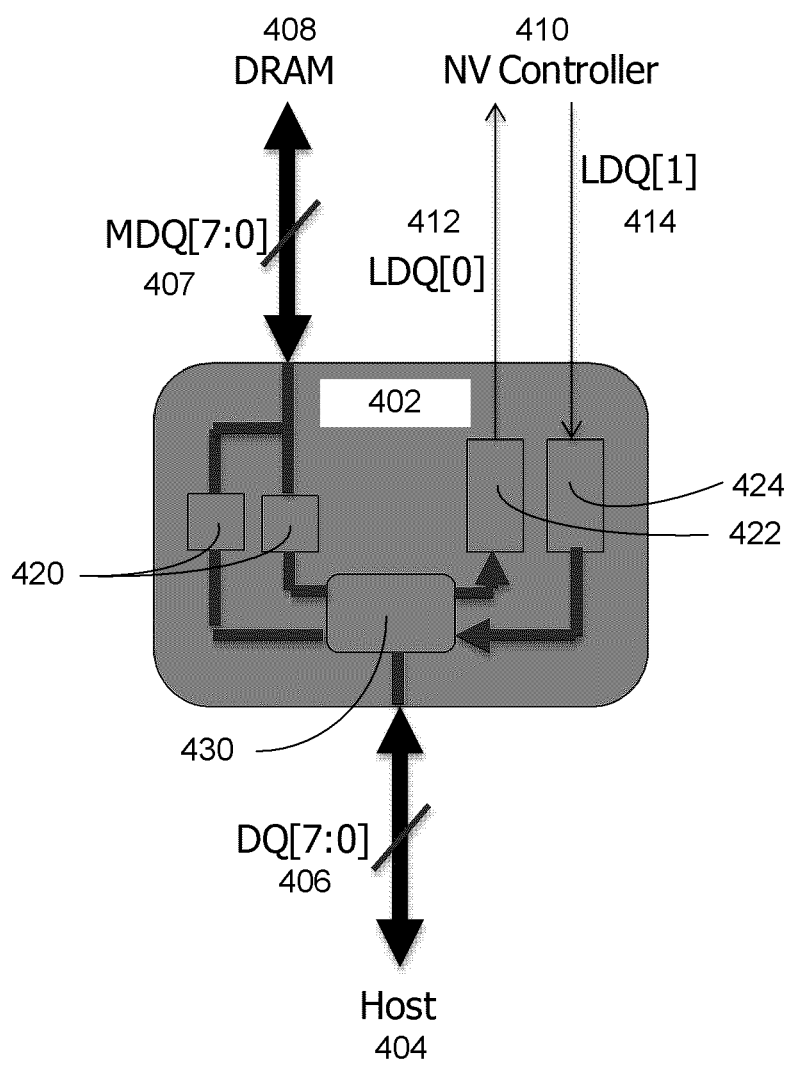
FIG. 4 shows one embodiment of the invention showing an enhanced data buffer.

FIG. 4 illustrates, generally at 400, one embodiment of the invention showing the enhanced data buffer 402. At 404 is a host interface showing 8 data lines DQ[7:0] 406 interfacing into the enhanced data buffer 402. At 407 are 8 data lines MDQ[7:0] interfacing between the enhanced data buffer 402 and DRAM 408. At 410 are NV Controller signals, as shown LDQ[0] 412 coming from the enhanced data buffer 402 (destined for the flash memory (a write)), and LDQ[1] 414 going into the enhanced data buffer 402 (from the flash memory (a read)). At 420 are a read and a write buffer, including possibly a small FIFO, for the data read/written to DRAM 408 from the Host 404. At 422 are a write (412) and at 424 a read (412) buffer each including a FIFO, for the data read/written from/to eventually the flash via the NV Controller 410 by the Host 404. At 430 is a functional unit which is controlled by the BCOM bus and BCK (not shown in FIG. 4) and directs reads/writes to/from either the DRAM 408 or the flash (via NV Controller 410) to the Host 404. Functional unit 430 may also be controlled by a host processor via for example a RCW, M7 RCD, etc.

Conceptually functional unit 430 may be thought of as a switch. However in one embodiment functional unit 430 can do more than simply direct the Host 404 data to either the DRAM or flash. The NV Controller can direct DRAM 408 data MDQ[7:0] 407 to/from the NV Controller 410 LDQ bus 412, 414 which eventually goes to flash memory. Thus in one embodiment the NV Controller, for example, on a power fail situation can without Host 404 processor control store DRAM contents into flash. On power return restoring DRAM contents from flash is possible, again without Host 404 processor control. This sequence can also be invoked under processor control by, for example, a SAVE signal (e.g. FIG. 1 at 104 Save_n (e.g. CPU generated, hardwired power fail (like from the power supply, etc.))).

As illustrated in FIG. 4 the enhanced data buffer 402 is able to interface with the Host 404 bus at full DRAM 408 speeds for DRAM access and flash memory access (via NV Controller 410). On the flash side this is achieved by the FIFOs at 422 and 424 which can keep up with the full speed of the bus from the Host 404.

While the LDQ busses in FIG. 4 have been shown as uni-directional, the invention is not so limited and in other embodiments, the LDQ busses may be bidirectional, or parts of the bus bidirectional and other parts of the bus uni-directional. For example, the uni-directional LDQ port (bus), can be bi-directional depending on bandwidth requirements. As illustrated in FIG. 4 the buffers 422 and 424 can contain FIFOs and these may be of varying depths. For example for each LDQ port (e.g. LDQ[0], LDQ[1]) the FIFO may be 256 to 512 bytes or even more. Further each port FIFO may be different, for example, 422 may be 2048 bytes, while 424 may be 8192 bytes.

In one embodiment, not shown in FIG. 4 so as not to obscure the essence of the invention are strobe signals for the LDQ bus denoted as LDQS. In one embodiment rather than having a separate strobe signal the NV Controller can perform clock recovery on the data in order to derive when data is valid.

Figure 5:
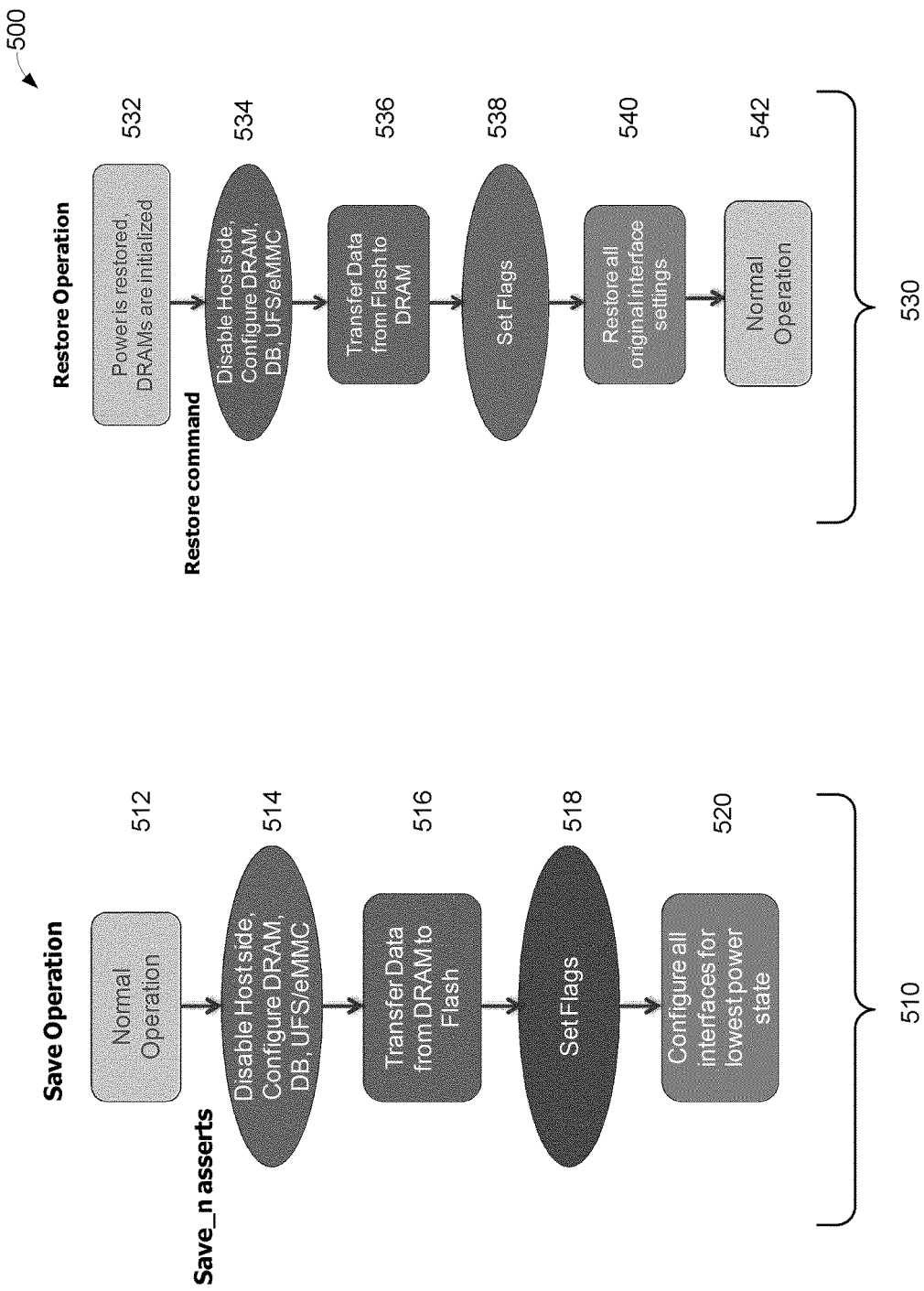
FIG. 5 shows one embodiment of the invention showing a data persistent mode.

FIG. 5 illustrates, generally at 500, one embodiment of the invention showing a data persistent mode for a power fail/restore sequence where at 510 is shown a Save Operation (power fail) and at 530 a Restore Operation (power restored). For a Save Operation 510, at 512 there is Normal Operation until a Save_n signal is asserted at which point steps 514 through 520 are performed. At 514 Disable Host side, Configure DRAM, DB, UFS/eMMC/SATA/NAND. At 516 Transfer Data from DRAM to Flash. At 518 Set Flags (e.g. to indicate save operation). At 520 Configure all interfaces for lowest power state (e.g. because entered save state and not operational). For a Restore Operation 530, at 532 Power is restored and DRAMs are initialized, then once a Restore command is received steps 534 through 542 are performed. At 534 Disable Host side, Configure DRAM, DB, UFS/eMMC/SATA/NAND. At 536 Transfer Data from Flash to DRAM. At 538 Set Flags (e.g. to indicate restore operation). At 540 Restore all original interface settings (e.g. enable Host side, etc.). At 542 resume Normal Operation.

Figure 6:
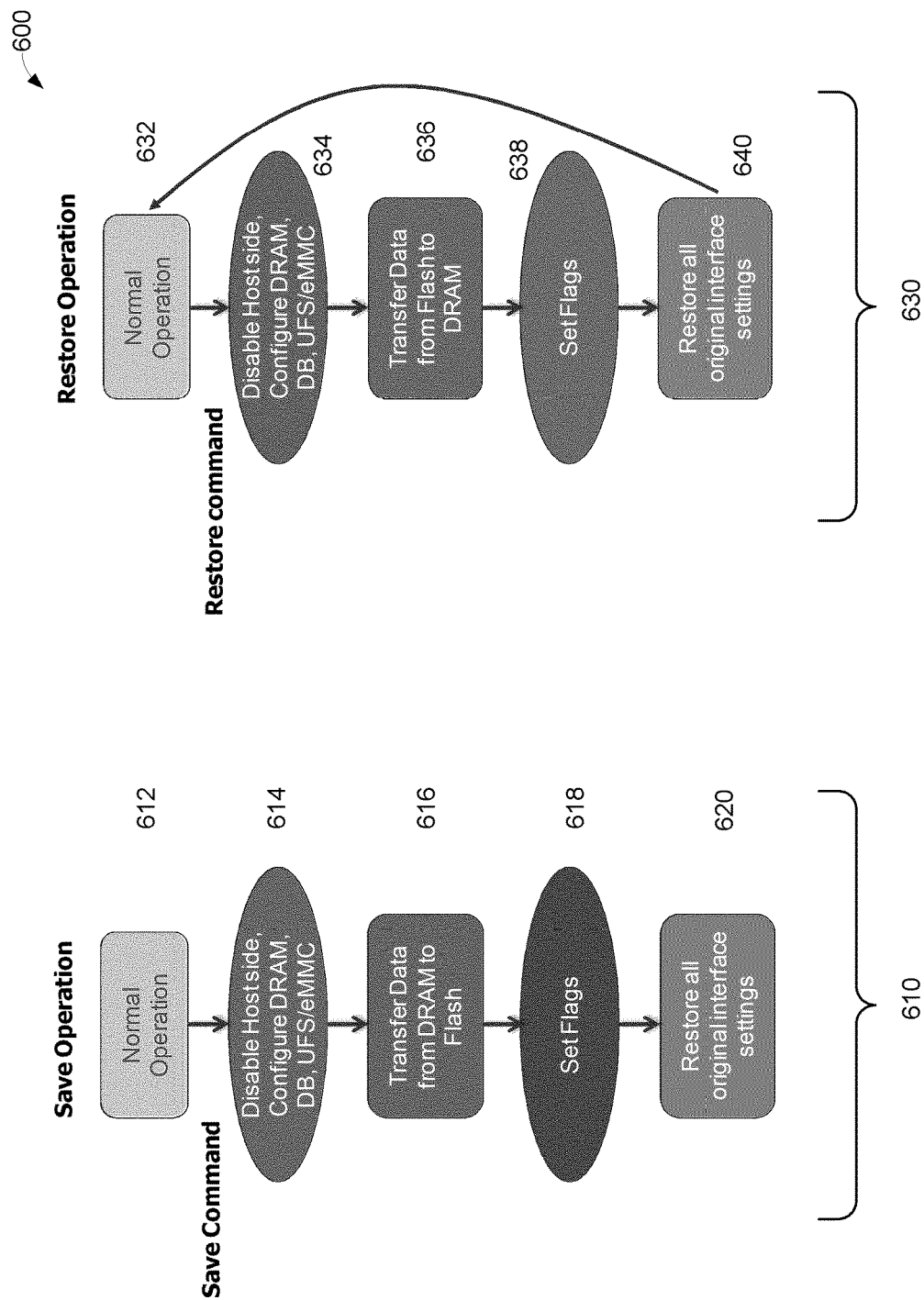
FIG. 6 shows one embodiment of the invention showing a host in band command data persistent mode.

FIG. 6 illustrates, generally at 600, one embodiment of the invention showing what is referred to as a host in band command data persistent mode. For example, not a power loss situation, but rather one in which the host CPU initiates a Save 610 and/or Restore 630 operation. For a Save Operation 610, at 612 there is Normal Operation until a Save Command is received at which point steps 614 through 620 are performed. At 614 Disable Host side, Configure DRAM, DB, UFS/eMMC/SATA/NAND. At 616 Transfer Data from DRAM to Flash. At 618 Set Flags (e.g. to indicate save operation). At 620 Restore all original interface settings (e.g. enable Host side, etc.). For a Restore Operation 630, at 632 Normal Operation continues until a Restore command is received at which point steps 634 through 640 are performed. At 634 Disable Host side, Configure DRAM, DB, UFS/eMMC/SATA/NAND. At 636 Transfer Data from Flash to DRAM. At 638 Set Flags (e.g. to indicate restore operation). At 640 Restore all original interface settings (e.g. enable Host side, etc.) and then proceed back to 632 Normal Operation.

What is to be appreciated is that the NV Controller can handle the data persistent mode associated with a power fail event, and handle a host in band command data persistent mode without a power fail event.

Figure 7:
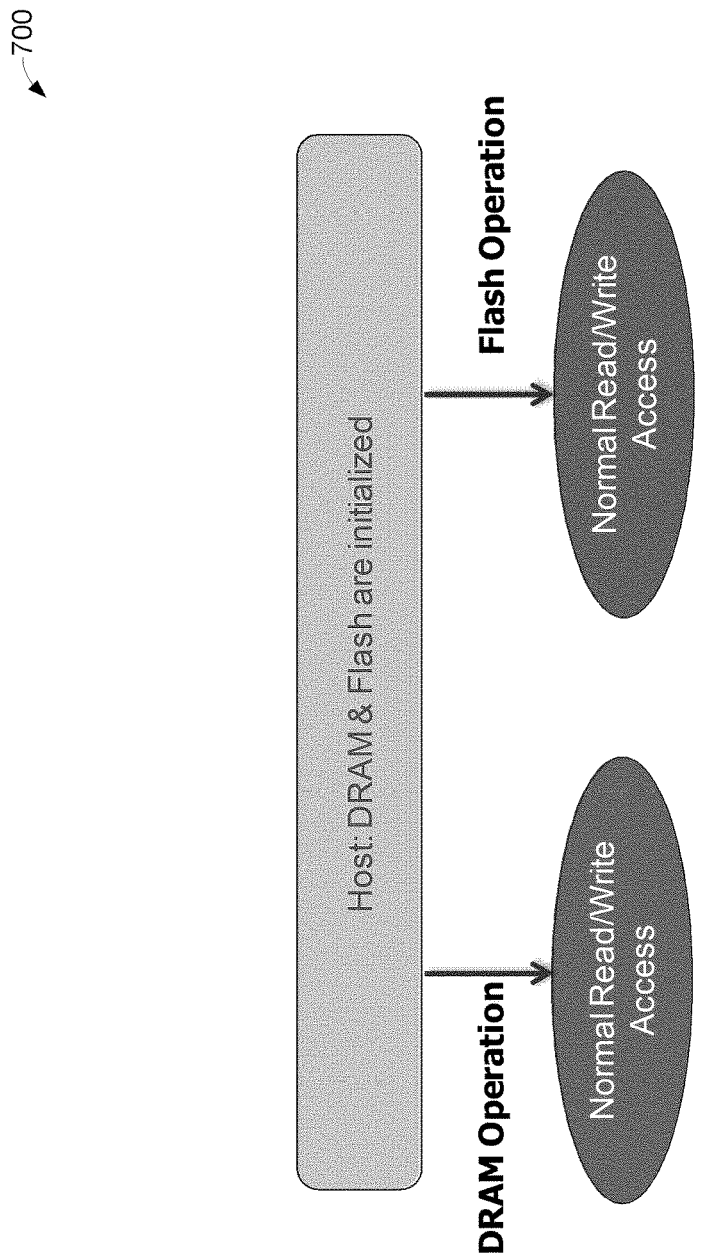
FIG. 7 shows one embodiment of the invention showing simultaneous DRAM and flash access.

FIG. 7 illustrates, generally at 700, one embodiment of the invention showing concurrent DRAM and flash access. This allows the data persistent mode discussed above as well as the host in band command data persistent mode discussed above.

Thus an Enhanced Data Buffer and Intelligent NV Controller for Simultaneous DRAM and Flash Memory Access has been described.

Because of the high speed embodiments of the present invention require specialized hardware.

As used in this description "simultaneous" or similar phrases means that an embodiment of the invention allows access to DRAM and flash memory at full DRAM bandwidth. That is, the host processor sees the bus interface running at full DRAM speed without the need to slow the bus interface down for accessing the flash memory. Thus from the host processor's point of view accessing DRAM and flash memory is simultaneous. Further from the NV Controller's point of view it is handling simultaneously both DRAM and flash memory operations (including reads and writes).

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "concurrent" or "simultaneous" or similar phrases are used to indicate that the operations when viewed from the perspective of the NV controller the respective memory (e.g. DRAM, flash) operations may operate in parallel. For example, a read access to DRAM and flash may both proceed in parallel each reading at the same point in time. However, each need not complete the operation at the same time. That is a slower access memory may be read concurrently with a faster access memory where each may finish the read in its respective read access time.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus an Enhanced Data Buffer and Intelligent NV Controller for Simultaneous DRAM and Flash Memory Access has been described.

What is claimed is:

1. An apparatus comprising on a DIMM:

an NV Controller on said DIMM, said NV Controller having a host interface, a DRAM interface, a flash memory interface, and a data buffer interface, said host interface in communication with a connector on said DIMM wherein said connector receives a host address, a host clock, a host control, and a host save, said DRAM interface in communication with one or more DRAMs on said DIMM, said flash memory interface in communication with one or more flash memory devices on said DIMM, and said data buffer interface in communication with one or more enhanced data buffers on said DIMM, wherein said enhanced data buffers have an input coupled to said connector to receive from a host processor data of 8 bits or more, said data coupled to a functional unit, wherein said functional unit has a DRAM read buffer and a DRAM write buffer, said DRAM read buffer and said DRAM write buffer connected to said one or more DRAMs, and wherein said functional unit has a read buffer including a read FIFO and a write buffer including a write FIFO, said read buffer and said write buffer connected to said NV Controller, wherein said functional unit is controlled by said host processor via a register command word written in a command space of said NV Controller, and wherein said connector receives a host Inter-Integrated Circuit (I2C) signal that is connected directly to said NV Controller and wherein a serial presence detect (SPD) is external to said NV Controller and information from said SPD does not go through said NV Controller, wherein the NV Controller configuration above using, the one or more enhanced data buffers allows transparent access to the one or more DRAMs on said DIMM and the one or more flash memory devices on said DIMM at the same time, the transparency from a standpoint that the host processor sees a same interface and a level of performance from the one or more DRAMs and the one or more flash memory devices.

* * * * *